United States Patent [19]
Weinstock

[11] Patent Number: 5,138,185
[45] Date of Patent: Aug. 11, 1992

[54] ELECTRICAL BACKUP INTERFACE DEVICE HAVING LOW POWER OUTPUT

[76] Inventor: Stephen M. Weinstock, 106 Poinciana La., Largo, Fla. 34640

[21] Appl. No.: 614,467

[22] Filed: Nov. 15, 1990

[51] Int. Cl.$^5$ ............................................. H02J 7/00
[52] U.S. Cl. ............................................. 307/66; 307/64
[58] Field of Search ................................. 307/64-66

[56] References Cited

U.S. PATENT DOCUMENTS 3,968,417  5/1975  Dials .................................. 320/2
4,712,055  4/1987  Houser, Jr. ......................... 320/35

Primary Examiner—Howard L. Williams
Assistant Examiner—Aditya Krishnan
Attorney, Agent, or Firm—Joseph C. Mason, Jr.; Ronald E. Smith

[57] ABSTRACT

A portable module that provides an interface between alternating current wall outlets and appliances for the purpose of maintaining an appliance in a quiescent state for a preselected period of time if the alternating current power at the wall outlet fails. The module includes a battery and a direct current to alternating current low power inverter that are effectively out of the circuit when AC power is being delivered to the appliance but which are brought into the circuit when the AC power to the appliance is interrupted. The inverter supplies enough power to keep digital clocks or other low power-requiring auxiliary units contained within the appliance from stopping so that they need not be reset if the outage is brief.

10 Claims, 2 Drawing Sheets

ELECTRICAL BACKUP INTERFACE DEVICE HAVING LOW POWER OUTPUT

TECHNICAL FIELD

This invention relates, generally, to devices that provide a low level of backup power to an electrical device when a power failure occurs. More particularly, it relates to such a device that provides power sufficient only to maintain the device in a quiescent state.

BACKGROUND ART

Due to advances in electronics, the cost of digital clocks has fallen so low that they are commonly provided in numerous household devices or appliances such as microwave ovens, video cassette recorders, radios, and the like. These clocks, unlike most analog clocks, are operated by direct current at very low voltages. Thus, line power, which is typically relatively high voltage alternating current, must be stepped down to a lower voltage by a transformer means and changed into direct current by a suitable rectifier means within the device that includes the digital clock.

Unlike analog clocks which are driven by line power and which re-start when line power is restored after an interruption, digital clocks do not re-start after even a brief interruption of power. Instead, they are designed to go into a predetermined mode to indicate that a power interruption has occurred; typically, a digital clock will flash he time twelve o'clock a.m. continually until it is reset.

For a large household with numerous digital clocks, the continual resetting of digital clocks after power interruptions is a burdensome core, especially during the summer months when lightning storms can cause brief power interruptions several times a day. A recent study has indicated that most power outages last only about four seconds, but that is more than enough time to precipitate the chore of resetting digital clocks.

Devices have heretofore been developed that monitor line current, detect voltage drops, and activate backup power sources upon said detection to prevent any discontinuity in the power supplied to the protected device. One very well known device of this type is employed in connection with personal computers. Since RAM memory is lost when power is interrupted, external uninterruptable power supplies provide line current to the entire computer when line current is interrupted. These devices are expensive and therefore cannot be used to backup the power supply to digital clocks because of cost restraints. Moreover, these devices provide full power during the power outage.

What consumers need is a small, inexpensive black box that they can plug into any AC wall outlet and into which they can plug a VCR, radio, or other device that includes a digital clock as a auxiliary item. The black box would include means for detecting voltage drops of the type that herald a power interruption, and means for delivering only low current alternating line level voltage to the digital clock in the device. This device would simulate the power company in terms of voltage and frequency but be capable of supplying only small currents.

The prior art, however, neither teaches nor suggests how such a device could be provided economically. Just as significantly, the prior art doesn't even suggest that such a device should be provided. All prior art backup devices that are known deliver full power to the device or appliance when line current is interrupted. As a result, the batteries in such devices are necessarily expensive.

DISCLOSURE OF INVENTION

A small module includes a plug member that plugs into any wall outlet of the type that provides 115 volts AC, and said module further includes a socket member that accepts a similar plug. Thus, the novel module is plugged into a wall outlet and any device including a digital clock or other low power-requiring device as an auxiliary unit is plugged into the module. The module is very inexpensive so that a consumer can purchase one with each purchase of a digital clock-containing piece of electronic equipment. Importantly, the customer need not perform any installation, nor is there any need to open the protected device to install the module.

The module, in its preferred form, includes a rechargeable battery, a trickle charger means connected to line current to maintain the battery in a charged state, a means for detecting drops in line voltage, and a low power inverter means for coupling the backup power supply to the protected appliance upon detection of said voltage drop.

A timer may be provided to interrupt the backup power supply in the event of a relatively long term power interruption so as not to present a decaying voltage level to an appliance as the battery discharges. Thus, resetting of the digital clocks will still be required if the power outage lasts beyond a certain preselected period of time such as thirty seconds, e.g.

Significantly, full line power is not delivered to the appliance during a power failure. AC power at a lower level, sufficient only to maintain operation of auxiliary devices in the appliance, such as digital clocks, is delivered to the appliance during the outage. Thus, the appliance is maintained in its quiescent state only. A coffee maker, not in its brewing cycle, will be maintained in its automatic timer mode, e.g.; if the coffee maker is drawing large amounts of energy when the outage occurs, the novel module disclosed herein will not deliver full power thereto, nor will it deliver auxiliary power thereto in that limited circumstance.

It is therefore understood that the primary object of this invention is to provide an inexpensive to manufacture and thus affordable to consumers device that eliminates the chore of resetting digital clocks after all power interruptions that are of less temporal extent than a preselected period of time.

A more general object is to provide means for maintaining low power to miscellaneous auxiliary devices during power outages to keep the devices in their operative state for at least a period of time greater than the temporal extent of an average power outage.

The invention accordingly comprises the features of construction, combination of elements and arrangement of parts that will be exemplified in the construction set forth hereinafter and the scope of the invention will be set forth in the claims.

BRIEF DESCRIPTION OF THE DRAWINGS

For a fuller understanding of the nature and objects of the invention, reference should be made to the following detailed description, taken in connection with the accompanying drawings, in which.

BEST MODES FOR CARRYING OUT THE INVENTION

Figure 1:
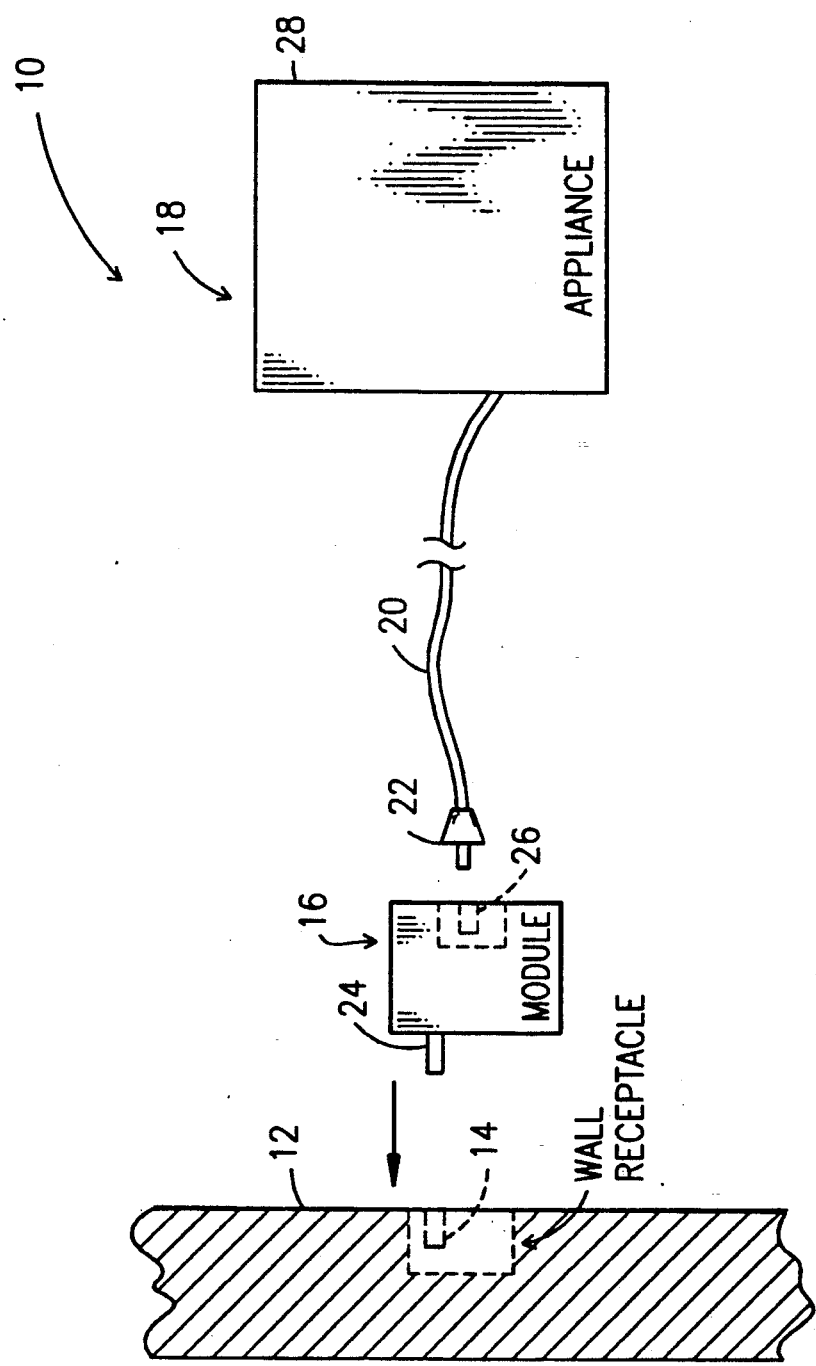
FIG. 1 is a diagrammatic representation of the novel interface device and its environment.

Referring now to FIG. 1, it will there be seen that the environment within which the novel module has utility is denoted as a whole by the reference numeral 10.

Environment 10 includes a structural wall 12, a receptacle or socket 14, the novel module 16, and an appliance 18 having a electrical cord 20 that terminates in a plug 22. Module 16 includes a plug 24 that engages wall socket 14 and a socket 26 that accepts appliance plug 22. Finally, appliance 18 further includes a digital clock 28 or other low power requirement auxiliary element that operates on low voltage direct current.

Socket 14 supplies 115 voltage AC to any device in electrical communication therewith. It should be understood from the outset that appliance 18 includes its own step down transformer and rectifier means to deliver low power direct current to clock 28 or similar auxiliary element.

Figure 2:
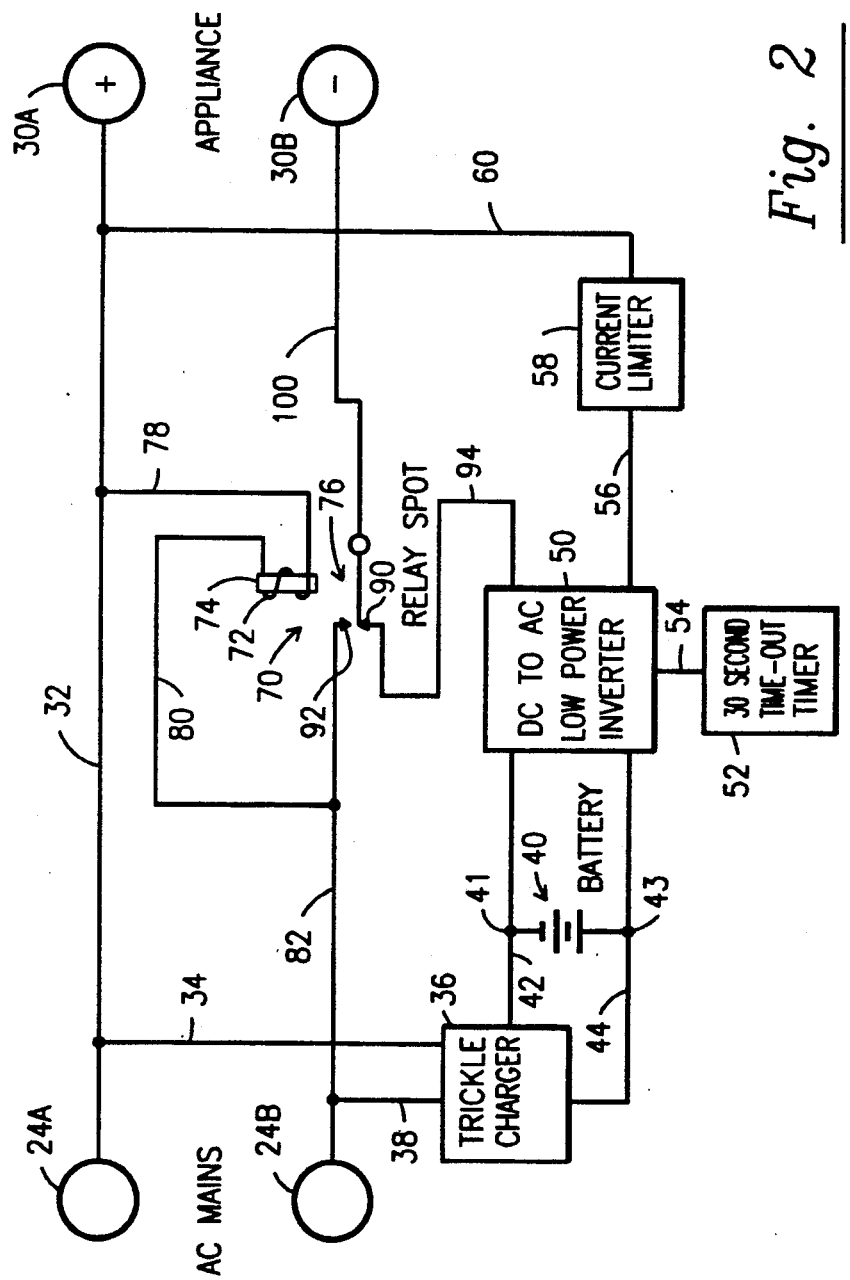
FIG. 2 is a schematic diagram of the circuit within the novel module.

In FIG. 2, plug 24 of module 16 is represented by return and hot electrical terminals 24A, 24B, respectively. Similarly, the electrical terminals of appliance 18, not shown in FIG. 1, are denoted 30A, 30B in FIG. 2.

The line interconnecting AC return terminals 24A and 30A is denoted 32. There are three conductors that branch therefrom as shown. Branch line 34 extends between conductor 32 to a trickle charger 36 as shown; said trickle charger 36 is connected to AC hot terminal 24B by line or conductor 38.

Rechargeable DC battery 40 is in electrical communication with trickle charger 36 through lines 42, 44 and in electrical communication with a low power DC to AC inverter 50 through lines 46, 48.

A timer means 52 is conductively coupled to said inverter 50 through line 54.

Line 56 couples together inverter 50 and current limiter 58, and line 60 interconnects said limiter 58 and terminal 30A.

A relay means 70 may take many forms but in a contemplated commercial embodiment of the invention said means includes a solenoid means including coil 72 and plunger 74 and further includes a single pole double throw switch denoted 76 as a whole. The poles of said switch are denoted 90. 92.

When line current of normal values is supplied to terminals 24A, 24B, switch 76 is thrown to pole 92 (which position is not shown), and current flows from terminal 24A through line 32 to terminal 30A and through branch line 78, coil 72, line 80, energizing said coil through line 82 to terminal 24B, and energizing the appliance 18 through relay contact 92 and relay arm 76 to terminal 30B through conductor 100, thereby operating appliance 18

Simultaneously, current flows through branch lines 34 and 38 through trickle charger 36 and battery 40 to maintain said battery in its charged state.

Current does not flow through inverter 50 during such normal operating conditions because line 94 leads to an open circuit at such times.

When line current is interrupted, even for a brief moment, the electromagnetic field associated with coil 72 begins to dissipate, thereby releasing plunger 74 which in turn throws switch 76, i.e., switch 76 is thrown from pole 92 to pole 90. This is the configuration shown in FIG. 2. Inverter 50 is now a part of the circuit because line 94 no longer extends to an open circuit at terminal 90.

Since appliance 18 will continue to call for power at terminals 30A, 30B, a load will be applied across the terminals 41, 43 of battery 40 and the battery will begin discharging through inverter 50 and low power alternating current will be delivered to terminals 30A, 30B through lines 56 and 60 (terminal 30A) and 94 and 100 (terminal 30B). However, inverter 50 is a low power inverter. Thus, it changes the direct current from battery 40 to alternating current, but delivers a very low voltage and current to terminals 30A, 30B of appliance 18. Thus, if the appliance is a microwave oven, e.g., that is running (i.e., the magnatron is operating), when the line current is interrupted, insufficient power will be supplied thereto by inverter 50 and the magnatron will shut down and any digital clocks built into the oven will require re-starting.

However, if a microwave oven, e.g., were in its quiescent state at the time of power interruption, then inverter 50 will supply sufficient power to maintain the oven or other clock-containing device in its quiescent state, i.e., it will supply sufficient power to maintain the digital timers and controls in their operating state, thereby accomplishing the primary object of this invention.

Current limiter 58, which performs the function its name expresses, comes into play if the appliance 8 is calling for full power at the time of power failure, since battery 40 would be drained very quickly if a large current were required therefrom. Similarly, since module 16 is intended to provide low power only for brief periods of time, timer 52 will shut off inverter 50 after the lapse of a predetermined amount of time such as thirty seconds.

This invention is clearly new and useful. Moreover, it was not obvious to those of ordinary skill in this art, at the time this invention was made, in view of the prior art considered as a whole in accordance with the requirements of law.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. In an electrical circuit that supplies low level backup power to an appliance during a power outage, comprising:
   a battery means;
   a low power direct current to alternating current inverter means conductively coupled to said battery means;
   said inverter means being selectively conductively coupled to said appliance;
   a relay means disposed between said inverter means and said appliance;

said relay means being operative to bypass said inverter means when line power is being supplied to said appliance;

said relay means being operative to conductively couple said inverter means and hence said battery means to said appliance when line power is not supplied to said appliance;

said inverter means being operative to supply sufficient alternating current power to maintain operation of said appliance's digital timers and controls during said power outage for a preselected period of time.

2. The device of claim 1 wherein said battery means is a rechargeable battery.

3. The device of claim 2, further comprising a timing means that opens a circuit between said battery and said appliance after the lapse of a preselected period of time.

4. The device of claim 3, further comprising a current limiting means electrically disposed between said inverter means and said appliance, said current limiting means adapted to open the circuit between the inverter means and the appliance if current drawn by said appliance exceeds a predetermined threshold.

5. The device of claim 4, further comprising a trickle charger means electrically connected between a source of alternating current power and said battery.

6. A device that supplies backup power to an appliance during a power outage, comprising:
a pair of input terminals adapted for releasable engagement to a source of alternating current power sufficient to operate said appliance;
a pair of output terminals adapted for releasable engagement to input terminals associated with said appliance;
a first conductor electrically connecting a first input terminal of said pair of input terminals to a first output terminal of said pair of output terminals;
a solenoid-controlled switch means;
a second conductor electrically connecting a second input terminal of said pair of input terminals to said solenoid-controlled switch means;
said solenoid-controlled switch means being electrically connected to a second output-terminal of said pair of output terminals;
a battery means electrically coupled between said pair of input terminals and said pair of output terminals;
a low power direct current to alternating current inverter means electrically coupled between said pair of input terminals and said pair of output terminals;
a third conductor means disposed between said first and second conductors;
said solenoid-controlled switch means disposed in said third conductor so that current flows therethrough when current flows through said first and second conductors;
said solenoid-controlled switch means being closed by said solenoid means when current flows through said first and second conductors so that said line current is delivered to said appliance;
said solenoid-controlled switch means being opened when line current does not flow through said first and second conductors; and
said battery means and said inverter means being electrically connected to said appliance when said solenoid-controlled switch means is opened;
whereby low power alternating current is delivered to said appliance to maintain said appliance in a quiescent state when said source of alternating current power is interrupted.

7. The device of claim 6, wherein said battery means is a rechargeable battery.

8. The device of claim 7, further comprising a timer means electrically coupled to said inverter means, said timer means adapted to deactivate said inverter means to thereby interrupt power delivery to said appliance after the lapse of a preselected period of time that begins when power to said appliance is interrupted.

9. The device of claim 8, further comprising a current limiting means electrically disposed between said inverter means and said appliance, said current limiting means adapted to limit current to the appliance if current drawn by said appliance exceeds a predetermined threshold.

10. The device of claim 9, further comprising a trickle charger means electrically connected between a source of alternating current power and said battery.

* * * * *